United States Patent

Lucas

[11] Patent Number: 5,420,196
[45] Date of Patent: May 30, 1995

[54] PRIMERLESS ONE COMPONENT RTV SILICONE ELASTOMERS

[75] Inventor: Gary M. Lucas, Scotia, N.Y.

[73] Assignee: General Electric Company, Waterford, N.Y.

[21] Appl. No.: 228,062

[22] Filed: Apr. 15, 1994

[51] Int. Cl.⁶ .................................. C08K 5/54
[52] U.S. Cl. .................... 524/730; 524/188; 524/265; 524/731; 427/387; 528/18; 528/901
[58] Field of Search ............... 524/731, 730, 265, 188; 528/18, 901; 427/387

[56] References Cited

U.S. PATENT DOCUMENTS

| | | |
|---|---|---|
| 4,100,129 | 7/1978 | Beers . |
| 4,273,698 | 6/1981 | Smith, Jr. et al. . |
| 4,417,042 | 11/1983 | Dziark . |
| 4,483,973 | 11/1984 | Lucas et al. . |
| 4,506,058 | 3/1985 | Ashby et al. . |
| 4,514,529 | 4/1985 | Beers . |
| 4,528,353 | 7/1985 | Lucas et al. . |
| 4,585,821 | 4/1986 | Progneaux et al. . |
| 4,623,693 | 11/1986 | Inoue et al. . |
| 4,672,003 | 6/1987 | Letoffe . |
| 4,680,364 | 7/1987 | Lucas . |
| 4,891,393 | 1/1990 | Hirai et al. . |
| 4,962,152 | 10/1990 | Leempoel . |
| 5,175,057 | 12/1992 | Wengrovius et al. . |
| 5,232,982 | 8/1993 | Lucas . |

Primary Examiner—Melvyn I. Marquis

[57] ABSTRACT

A one component room temperature vulcanizable silicone elastomer having primerless adhesion to polyacrylate useful as a sealant 12 Claims, No Drawings

PRIMERLESS ONE COMPONENT RTV SILICONE ELASTOMERS

BACKGROUND OF THE INVENTION

Polyacrylate, commonly referred to as Plexiglas ® (Rohm & Haas), is a popular plastic used for a variety of construction applications including glazing and roofing. Primerless adhesion to polyacrylate is, therefore, a an important property for room temperature vulcanizable (RTV) elastomers and sealants in the marketplace. Translucent, room temperature curable, silicone sealants frequently demonstrate adequate auto-adhesion to glass, aluminum, and PVC plastic. Adhesion to other plastics, for example polyacrylate, is much more difficult to achieve. For example, translucent, alkoxy curing, RTV compositions disclosed by Lucas et al. U.S. Pat. Nos. 4,483,973 and 4,528,353, utilizing amino functional silane adhesion promoters show excellent long term primerless adhesion to glass, metals, ceramics/mortar, and a variety of plastics including ABS, Noryl ®, polystyrene, and nylon, but do not adhere to polyacrylate.

Wengrovius and Lucas, U.S. Pat. No. 5,175,057, herewith incorporated by reference, disclose a 1-component, alkoxy curing, dialkyltin-bis-diketonate catalyzed RTV's containing and adhesion promoter which is the reaction product of an "M,D,T" silanol fluid and alkoxy silane functionalized by radicals selected from amino, ether, epoxy, isocyanato, cyano, acryloxy and acyloxy. Wengrovius '057 does not teach auto-adhesion to polyacrylate. Lucas, U.S. Pat. No. 5,232,982, herewith incorporated by reference, discloses scavenger reduced, alkoxy, RTV compositions having improved primerless adhesion to plastics, particularly polycarbonate. However, Lucas '982 does not teach primerless adhesion to polyacrylate.

The use of titanium chelates as self bonding agents for alkoxy curing RTV's is disclosed by Lucas in U.S. Pat. No. 4,680,364. The RTV compositions of U.S. Pat. No. 4,680,364 are filled with fumed silica, have limited self bonding to polyacrylate and suffer the limitation of opacity due to the poor solubility of the titanium chelates in PDMS.

There are numerous other examples, in the Patent literature, describing self bonding, 1-part, RTV compositions for example; Ashby and Lucas, U.S. Pat. No. 4,506,058; Beers U.S. Pat. Nos. 4,100,129 and 4,514,529; Mitchell, U.S. Pat. No. 4,273,698; Leempol U.S. Pat. No. 4,962,152; Inoue et al., U.S. Pat. No. 4,623,693; Letofie, U.S. Pat. No. 4,672,003; Hirai et al., U.S. Pat. No. 4,891,393; and Progneaux and Trego, U.S. Pat. No. 4,585,821. None of these references, however, teach auto or self-adhesion of room temperature vulcanizable silicone elastomers to polyacrylate.

Thus, there continues to be a need to provide a curable RTV silicone composition containing a reinforcing inorganic filler, having the combination of properties that include translucency, neutral alkoxy cure, and shelf stability in conjunction with primerless adhesion to polyacrylate.

SUMMARY OF THE INVENTION

The present invention relates to room temperature vulcanizable silicone compositions with primerless adhesion to polyacrylate plastic. More particularly, the present invention relates to the discovery of 1-component, translucent, alkoxy curing, RTV's that adhere to polyacrylate plastic without a primer. These RTV's are comprised of:

1) a polyalkoxysilane endcapped dimethylsilicone polymer,
2) an alkoxy silane crosslinker,
3) a low level of a tin condensation cure catalyst from the class of $R_2Sn(\text{beta-diketonate})_2$ complexes,
4) an epoxy silane adhesion promoter,
5) an acrylic or methacrylic functional alkoxy silane adhesion promoter, and
6) a polyalkoxysilylalkyl isocyanurate.

DESCRIPTION OF THE INVENTION

Generally described the present invention embodies a room temperature vulcanizing silicone composition comprising:

(a) an alkoxy terminated polydimethylsiloxane polymer;
(b) a reinforcing fumed silica filler;
(c) a cyano-functional alkoxy silane processing aid;
(d) a triorganosilyl endstopped diorganopolysiloxane;
(e) an "M,D,T" silanol fluid comprising:
  (i) mono-organosiloxy units;
  (ii) triorgano-siloxy units;
  (iii) diorgano-siloxy units: and
  (iv) siloxy units, wherein the organo groups of the "M,D,T" fluid are C1 to C10 (210 monovalent hydrocarbon radicals;
(f) an alkoxysilane crosslinking agent;
(g) a stabilizer selected from the group consisting of disilazanes and polysilazanes;
(h) a diorganotin-bis-diketonate condensation cure catalyst;
(i) an epoxy silane adhesion promoter;
(j) an adhesion promoter selected from the group consisting of acrylic and methacrylic functional alkoxy silanes; and
(k) a polyalkoxysilylalkyl isocyanurate.

The present invention teaches that primerless adhesion to polyacrylate is obtained using a synergistic combination of glycidoxypropyltrimethoxysilane, methacryloxypropyltrimethoxysilane, and 1,3,5-tris(trimethoxypropylisocyanurate) at low levels of a dialkyltin-bis-diketonate cure catalyst. In contrast to the requirements of the prior art, the present invention does not require the presence of an "M,D,T" silanol fluid for effective auto-adhesion to polyacrylate.

The present invention provides shelf stable, translucent, one component room temperature vucanizable, polysiloxane compositions having primerless adhesion to polyacrylate plastic, comprising:

(1) 100 parts by weight (pbw) of a polyalkoxy terminated PDMS produced according to the method described by Chung in U.S. Pat. No. 4,515,932 herewith incorporated by reference; of formula 1:

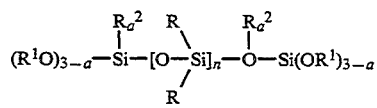

where each R and $R^2$ is independently a substituted or unsubstituted $C_{(1-15)}$ monovalent hydrocarbon radical, $R^1$ is a $C_{(1-8)}$ aliphatic organic radical selected from alkyl radicals, alkyl ether radicals, alkylketone radicals, alkylcyano radicals, or a $C_{(7-13)}$ aralkyl radical: "n" is a whole number ranging from about 50 to about 2500, and "a" is a whole number which is either 0 or 1. The viscosity range of the polymer of formula 1 is from about 100 to about 500,000 cps, preferably from about 5000 to about 300,000 cps, and most preferably from about 20,000 to about 200,000 cps at 25° C. The terminal silicon atom, of the polymer, must have at least two alkoxy groups and can have as many as three alkoxy groups in accordance with formula 1. Preferably the alkoxy end group is methoxy.

(2) From about 5 to about 25 pbw, preferably from about 9 to about 22 pbw, and most preferably from about 15 to about 19 pbw of a reinforcing fumed silica filler per 100 pbw polymer (1).

(3) From 0 to about 1.6 pbw, preferably from about 0.50 to about 0.80 pbw, and most preferably from about 0.80 to about 1.30 pbw, per 100 pbw of polymer (1), of a cyano-functional polyalkoxy silane processing aid (i.e. promotes improved extrusion rate and thixotropy) of formula (2);

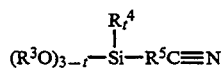

where each $R^3$ and $R^4$ is independently a monovalent hydrocarbon or substituted hydrocarbon radical having from 1 to about 18 carbon atoms, $R^5$ is a $C_{(2-12)}$ divalent hydrocarbon radical, and "t" is a number ranging from 0 to about 3.

In the compound of formula (2), $R^3$ and $R^4$ can be alkyl radicals, e.g., methyl, ethyl, propyl, and the like; alkenyl radicals, e.g., vinyl, alyl, and the like; cycloalkyl radicals, e.g., cyclohexyl, cycloheptyl, and the like; mononuclear aryl radicals, e.g., methylphenyl and the like: and fluoroalkyl radicals, e.g., 3,3,3-trifluoropropyl. Preferably, $R^3$ and $R^4$ are selected from methyl or ethyl, and most preferable are both methyl. $R^5$ is preferably an alkylene or arylene substituted divalent hydrocargon radical of 2-12 carbon atoms and more preferably from 2-8 carbon atoms.

The preferred compound within the scope of formula (2) is 2-cyanoethyltrimethoxysilane.
Other specific compounds include:
3-(cyanoethoxy)-3-methylbutenyltrimethoxysilane
2-cyanoethylmethyldimethoxysilane
2-cyanoethyltriethoxysilane
2-cyanopropyltrimethoxysilane
2-cyanoethylmethyldiethoxysilane
3-cyanopropyltriethoxysilane
1-cyanoethyltris(methoxyethoxy)silane.

(4) From about 7 to about 47 pbw, preferably from about 16 to about 31 pbw, and most preferably from about 20 to about 27 pbw, per 100 pbw of polymer (1), of a triorganosilyl endstopped diorganopolysiloxane having a viscosity of from 10 to 5000 cps at 25° C., where the organo groups are monovalent hydrocarbon radicals, preferably of from 1 to 8 carbon atoms. Such linear diorganopolysiloxane polymers are useful as plasticizers. Preferably, such plasticizers are free of silanol groups but there may be present up to 500 ppm of silanol groups. It is also preferable that the organo substituent groups are methyl and that the viscosity range varies from 15 to 1000 cps, and most preferably from about 20 to about 200 cps at 25° C.

(5) From 0 to about 24 pbw, preferably from about 5 to about 16 pbw, and most preferably from about 8 to about 13 pbw, per 100 pbw of polymer (1), of an "M,D,T" silanol fluid comprising:
  (i) from about 1 to about 80, preferably from about 10 to about 70, and most preferably from about 20 to about 60, mole percent mono-organosiloxy units;
  (ii) From about 0.5 to about 50, preferably from about 5 to about 40, and most preferably from about 10 to about 30, mole percent triorganosiloxy units;
  (iii) From about 1 to about 80, preferably from about 10 to about 70, and most preferably from about 20 to about 60, mole percent of diorganosiloxy units: and
  (iv) From 0 to about 25, preferably from 0 to about 5 and most preferably 0, mole percent siloxy units.

The organo groups of the "M,D,T" fluid are monovalent hydrocarbon radicals having from 1 to about 10 carbon atoms. Most preferably, these monovalent hydrocarbon radicals are alkyl radicals of from 1 to about 5, and preferably from about 1 to about 3 carbon atoms, and most preferably are methyl radicals.

(6) From 0 to about 5 pbw, preferably from about 0.5 to about 2.5 pbw, and most preferably from about 0.8 to about 1.6 pbw, per 100 pbw of polymer (1), of a polyalkoxysilane crosslinking agent of formula (3):

where $R^1$, $R^2$, and "a" are as previously defined.

(7) From about 0 to 2 pbw, preferably from about 0.5 to about 1.5 pbw, and most preferably from about 0.8 to about 1.3 pbw, per 100 pbw of polymer (1), of a stabilizing disilazane or polysilazane including those disclosed by Dziark, U.S. Pat. No. 4,417,042; herewith incorporated by reference. The preferred hydroxy scavenger is hexamethyldisilazane.

(8) From about 0.11 to about 0.17 pbw, per 100 pbw of polymer (1), of a diorganotin-bis-diketonate condensation cure catalyst of the general formula (4):

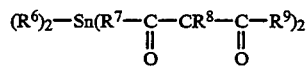

where $R^6$ is selected from $C_{(1-18)}$ monovalent hydrocarbon radicals and substituted hydrocarbon radicals, and $R^7$, $R^8$, and $R^9$ are the same or different monovalent radicals selected from the class consisting of hydrogen, $R^6$, $OR^6$, $-Si(R^6)_3$, aryl, acyl, and nitrile.

Radicals included within $R^6$ of formula (4) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives, for example, cyclohexyl, cyclobutyl: alkyl and alkenyl radicals, such as methyl, ethyl, propyl, chloropropyl, butyl, pentyl, heptyl, octyl, vinyl, allyl, and trifluoropropyl.

Some of the tin condensation catalysts included with in the scope of formula (4) are, for example:

di(n-butyl)tin bis(acetylacetonate)
di(n-butyl)tin bis(benzoylacetonate)
di(ethyl)tin bis(lauroylacetonate)

di(methyl)tin bis(pivaloylacetonate)
di(n-octyl)tin bis(acetylacetonate)
di(n-propyl)tin bis(1,1,1-trifluoroacetylacetonate)
di(n-butyl)tin bis(ethylacetoacetate)
di(n-butyl)tin (acetonate)(ethylacetoacetate).

Diorganotin dicarboxylate condensation cure catalysts are excluded from the present invention.

(9) From about 0.16 to about 3.1 pbw, preferably from about 0.3 to about 1.6 pbw, and most preferably from about 0.5 to about 1.1 pbw, per 100 pbw of polymer (1), of an epoxy silane adhesion promoter of formula(5):

$$(R^{10}O)_{3-b}-\underset{\underset{R_b^{11}}{|}}{Si}-R^{12}OR^{13}-\underset{\underset{R^{14}}{|}}{CH}-CH\underset{O}{\diagdown\diagup}$$

where $R^{10}$ and $R^{11}$ are $C_{(1-8)}$ monovalent hydrocarbon radicals, $R^{12}$ and $R^{13}$ are $C_{(2-12)}$ divalent hydrocarbon radicals such as alkylene, arylene, alkylenearylene radicals, and can be unsubstituted or substituted with various groups such as halogen groups, ether groups, ester groups, and other hydrocarbon groups. $R^{14}$ is selected fro the group consisting of hydrogen and $C_{(1-8)}$ monovalent hydrocarbon radicals and is preferable hydrogen. "b" varies from 0 to 3.

Suitable adhesion promoters within the scope of formula (5) and methods for making them are disclosed by Lucas et al U.S. Pat. No. 4,483,973, herewith incorporated by reference. Specific compounds with the scope of formula (5) include, for example:

gamma-glycidoxyproplylmethyldimethoxysilane
gamma-glycidoxypropyltriethoxysilane
gamma-glycidoxypropylmethyldiethoxysilane
gamma-glycidoxyethyltrimethoxysilane
epoxycyclohexlethyltrimethoxysilane
epoxycyclohexylethyltrimethoxysilane.

The most preferred compound within the scope of formula (5) is gamma-glycidoxypropyltrimethoxysilane.

(10) From about 0.16 to about 3.1 pbw, preferable from about 0.3 to about 1.6 and most preferably from about 0.5 to about 1.1 pbw, per 100 pbw polymer (1), of an acrylic or methacrylic functional alkoxy silane adhesion promoter of formula(6):

$$(R^{10}O)_3-\underset{\underset{R^{11}}{|}}{Si}-R^{12}-O-\underset{\underset{O}{||}}{C}-\underset{\underset{R^{13}}{|}}{C}=CH_2$$

"where $R^{10}$ and $R^{11}$ are $C_{(1-8)}$ monovalent hydrocarbon radicals and $R^{12}$ is a $C_{(1-8)}$ divalent hydrocarbon radical and" $R^{13}$ is selected from the group consisting of hydrogen and $C_{(1-8)}$ monovalent carbon radicals. The most preferred compound within the scope of formula(6) is gamma-methacryloxypropyltrimethoxysilane.

(11) From about 0.16 to about 3.1 pbw, preferably from about 0.3 to about 1.6 pbw, and most preferably from about 0.5 to about 1.1 pbw, per 100 pbw of polymer (1), of a polyalkoxysilyalkyl isocyanurate of formula(7):

$$(R^{11}O)_{3-b}-\underset{\underset{R_b^{10}}{|}}{Si}-R^{12}-\underset{\underset{O=C}{|}}{N}\underset{\underset{N}{|}\;G}{\overset{\overset{O}{||}}{\underset{|}{C}}}\underset{C=O}{\diagdown}N-G$$

where "G" is selected from $R^{10}$ radicals of the formula:

$$(R^{11}O)_{3-b}-\underset{\underset{R_b^{10}}{|}}{Si}-R^{12}-$$

where $R^{10}$ is a $C_{(1-8)}$ monovalent hydrocarbon radical or cyanoalkyl radical, $R^{11}$ is a $C_{(1-8)}$ monovalent hydrocarbon radical or cyanoalkyl radical, $R^{12}$ is a $C_{(2-12)}$ divalent radical selected from alkylenearylene, alkylene, and cycloalkylene and halogenated alkylenearylene, alkylene, and cycloalkylene, and where "b" varies from 0 to 3.

Specific examples of polyalkoxysilylalkyl isocyanurates useful in the present invention include:

1,3,5-tris(methyldimethoxysilylpropyl)isocyanurate
1,3,5-tris(methyldiethoxysilypropyl)isocyanurate
1,3,5-tris(trimethoxysilylpropyl)isocyanurate
1,3,5-tris(trimethoxysilylethyl)isocyanurate.

The most preferred compound within the scope of formula (7) is 1,3,5-tris(trimethoxysilylpropyl)isocyanurate.

In the present invention, the use of a tri-component organo functional polyalkoxysilane adhesion promoting system permits primerless adhesion to polyacrylates. A specific example of such a tri-component system comprises gamma-glycidoxyproplyltrimethoxysilane gamma-methylacyloxypropyltrimethoxysilane, and 1,3,5-tris(trimethoxysilyl)propylisocyanurate in combination with low levels ranging from about 0.07 to about 0.11 wt.% of a dialkylfin bis-diketonate condensation cure catalyst. The absence of one or more of the adhesion promoters or the presence of the tin catalyst outside the range of from about 0.07 to about 0.11 wt. %, may result in the loss of primerless adhesion to polyacrylate.

A detailed description of the continuous manufacture of the 1-part, translucent, alkoxy curing RTV polyacrylate adhesive, of the present invention, is given in example 1.

EXAMPLES

The following examples are intended to be non-limiting illustrations of the present invention.

EXAMPLE 1

Using a 30 mm Werner Pfiederer extruder, an RTV composition, referred to as "Composition A" was produced as follows:

COMPOSITION (A)

(1) 63.9 pbw of an alpha, omega-methyldimethoxy terminated PDMS polymer having a viscosity, of 125,000 cps;

(2) 11 pbw of a D4 treated, reinforcing fumed silica filler;

(3) 20 pbw of an alpha, omega-trimethyl terminated PDMS fluid having a viscosity of 20 cps;

(4) 0.7 pbw of hexamethyldisilazane stabilizer;
(5) 0.5 pbw of methyltrimethoxysilane crosslinker;
(6) 0.7 pbw of cyanoethyltrimethoxysilane processing aid;
(7) 0.10 pbw of $Bu_2Sn(Acac)_2$ condensation cure catalyst;
(8) 0.5 pbw of glycidoxypropyltrimethoxysilane adhesion promoter;
(9) 0.5 pbw of methacryloxypropyltrimethoxysilane adhesion promoter;
(10) 0.5 pbw of 1,3,5-tris(trimethoxysilylpropyl)isocyanurate;

WP EXTRUDER MIXING PROCEDURE

All sections of the extruder were heated to 75° C. To barrel 1 of the extruder, there was continuously metered in 63.9 pbw omega-methyldimethoxy terminated PDMS polymer, 11 pbw D4 treated silica filler, 0.7 pbw hexamethyldisilazane, and 0.70 pbw . To barrel 8, of the extruder, there was continuously metered in 20 pbw alpha, omega-trimethyl terminated PDMS fluid having a viscosity of 20 cps. To barrel 13, of the extruder, there was continuously metered in 0.50 pbw methyltrimethoxysilane, 0.50 pbw glycidoxypropyltrimethoxysilane, 0.50 pbw methacryloxypropyltrimethoxysilane, 0.50 pbw 1,3,5-tris(trimethoxysilylpropyl)isocyanurate, and 0.10 pbw dibutyltinacetylacetonate catalyst. RTV sealant was continuously produced at a rate of 40 lb/hr.

For comparison, RTV compositions, referred herein as compositions (B), (C), (D), (E) and (G) were prepared using the same base formulation and continuous mixing procedure as in composition (A) but with the following adhesion promoter variations:

| Composition | Adhesion Promoter Type |
|---|---|
| B | glycidoxypropyltrimethoxysilane only |
| C | methacryloxypropyltrimethoxysilane only |
| D | 1,3,5-tris(trimethoxysilylpropyl)isocyanurate only |
| E | glycidoxypropyltrimethoxysilane and methacryloxypropyltrimethoxysilane only |
| F | glycidoxypropyltrimethoxysilane and 1,3,5-tris(trimethoxysilylpropyl)isocyanurate only |
| G | methacryloxypropyltrimethoxysilane and 1,3,5-tris(trimethoxysilylpropyl)isocyanurate only |

WPSTM C-628 peel adhesion, of the above RTV compositions, was measured on Plexiglas ® polyacrylate after (1) a 7 day cure at room temperature (RT) and 50% relative humidity (RH) and (2) a 7 day cure at RT and 50% RH followed by a 7 day RT water immersion. Results are given in table 1. Acceptable C-628 peel adhesion values are defined as >15 ppi pull values with >90% cohesive failure. Table 1 shows that adhesion to polyacrylate is obtained only when all three adhesion promoters are present (composition A).

TABLE 1

| Composition | c-628 PEEL ADHESION RESULTS (ppi/% CF) | |
|---|---|---|
| | 7 Day Cure | 7 Day Cure/7 Day Water Immersion |
| A | 25/100 | 21/100 |
| B | 0/0 | 0/0 |
| C | 0/0 | 0/0 |
| D | 0/0 | 0/0 |
| E | 0/0 | 0/0 |
| F | 0/0 | 0/0 |
| G | 0/0 | 0/0 |

Composition (A) was also tested for other uncured and cured sealant properties as summarized in table 2:

TABLE 2

Composition (A) Property Profile

| PROPERTY | COMPOSITION (A) RESULT |
|---|---|
| Appearance | Translucent |
| Specific Gravity | 1.035 |
| Boeing Flow, inch | 0.10 |
| Tack Free Time, minutes | 60 |
| Sheet Physicals (7 Day Cure) | |
| Durometer, Shore A | 16 |
| Tensile, psi | 185 |
| Elongation, % | 640 |
| Accel. Shelf Age Sheet Physicals (24 hr @ 100° C., 7 Day Cure) | |
| Durometer, Shore a | 16 |
| Tensile, psi | 210 |
| Elongation, % | 655 |
| C-628 Peel Adhesion (7 Day Cure), ppi/% CF | |
| Glass | 22/100 |
| Bare Aluminum | 23/100 |
| Anodized Aluminum | 25/100 |
| Cold Rolled Steel | 25/100 |
| Stainless Steel | 28/100 |
| PVC Plastic | 28/100 |
| ABS Plastic | 24/100 |
| Polycarbonate Plastic | 25/100 |
| Nylon 6 | 21/100 |
| Noryl Plastic | 27/100 |
| High Impact Polystyrene | 28/100 |
| Plexiglas ® Polyacrylate | 25/100 |

EXAMPLE 2

RTV compositions were prepared using the same base formulation as in example 1 (composition A) except that the $Bu_2Sn(Acac)_2$ condensation cure catalyst was replaced by the following commercial tin cure catalysts:
dibutyltin diacetate
dibutyltin dilaurate
dibutyltin dimethoxide
dimethyltin di(neodecanoate)
solubilized dibutyltin oxide (W6609)
tin octoate C-638 Peel adhesion was measured on Plexiglas ® polyacrylate after a 7 day cure, No measurable adhesion was obtained using any of the above condensation cure catalysts. Of the condensation cure catalysts studied, only $Bu_2Sn(Acac)_2$ catalyzed RTV compositions had primer less adhesion to polyacrylate.

EXAMPLE 3

RTV compositions were prepared with the same formulations as in example 1 (composition A) except that the $Bu_2Sn(Acac)_2$ condensation cure catalyst level was varied as follows:

0.03 pbw
0.05 pbw
0.07 pbw
0.10 pbw
0.12 pbw
0.14 pbw
0.16 pbw
0.18 pbw
0.20 pbw
0.25 pbw
0.30 pbw
0.35 pbw 0.40 pbw C-628 peel adhesion was measured on Plexiglas ® polyacrylate after a 7 day cure. Results are reported in Table 3. The data shows that polyacrylate adhesion is obtained only in a narrow Bu$_2$Sn(Acac)$_2$ range (i.e. 0.05 to 0.12 wt.%).

TABLE 3

Bu$_2$Sn(Acac)$_2$ Level vs. Polyacrylate Peel Adhesion

| Bu$_2$Sn(Acac)$_2$ · wt. % | C-628 Peel Result (7 day cure), ppi/% CF |
|---|---|
| .03 | 5/100 |
| .05 | 10/100 |
| .07 | 21/100 |
| .10 | 25/100 |
| .12 | 19/50 |
| .14 | 0/0 |
| .16 | 0/0 |
| .18 | 0/0 |
| .20 | 0/0 |
| .25 | 0/0 |
| .30 | 0/0 |
| .35 | 0/0 |
| .40 | 0/0 |

I claim:

1. A translucent room temperature vulcanizing silicone composition comprising:
   (a) an alkoxy terminated polydimethylsiloxane polymer;
   (b) an alkoxysilane crosslinking agent;
   (c) a diorganotin-bis-beta-diketonate condensation cure catalyst;
   (d) an epoxy silane adhesion promoter;
   (e) an adhesion promoter selected from the group consisting of acrylic and methacrylic functional alkoxy silanes; and
   (f) a polyalkoxysilylalkyl isocyanurate whereby said translucent room temperature vulcanizing silicone composition adheres to polyacrylate plastic.

2. The composition of claim 1 further comprising a reinforcing silica filler.

3. The composition of claim 2 wherein the concentration of the tin catalyst ranges from about 0.11 to about 0.17 parts by weight per hundred parts by weight of said polydimethylsiloxane polymer.

4. The composition of claim 2 wherein the catalyst comprises di(n-butyl)tin bis(acetylacetonate).

5. The composition of claim 1 wherein R$^1$ is methyl.

6. A translucent room temperature vulcanizing silicone composition comprising:
   (a) 100 parts by weight (pbw) of an alkoxy terminated polydimethylsiloxane polymer of the formula:

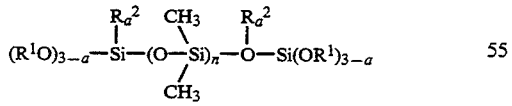

where R$^2$ is a substituted or unsubstituted C1 to C15 monovalent hydrocarbon radical, R$^1$ is a C1 to C8 aliphatic organic radical selected from alkyl radicals, alkyl ether radicals, alkylketone radicals, alkylcyano radicals, or a C7 to C13 arylalkyl radical: and wherein n is an integer ranging from about 50 to about 2500, and wherein a is an integer which is either 0 or 1, and wherein the viscosity range of said polydimethylsiloxane polymer is from about 100 to about 500,000 cps, at 25° C.; and wherein the terminal silicon atoms of said polydimethylsiloxane polymer must have at least two alkoxy groups;

(b) an amount of from about 5 to about 25 parts by weight of a reinforcing fumed silica filler per 100 parts by weight of said polydimethylsiloxane polymer;

(c) an amount of from 0 to about 1.6 parts by weight, per 100 parts by weight of said polydimethylsiloxane polymer of a cyano-functional alkoxy silane processing aid of the formula:

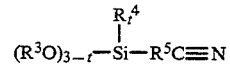

where each R$^3$ and R$^4$ is independently a monovalent hydrocarbon or substituted hydrocarbon radical having from 1 to about 18 carbon atoms, R$^5$ is a C2 to C12 divalent hydrocarbon radical, and t is an integer ranging from 0 to about 3;

(d) an amount of from about 7 to about 47 parts by weight per 100 parts by weight of said polydimethylsiloxane polymer, of a triorganosilyl endstopped diorganopolysiloxane having a viscosity ranging from about 10 to about 5000 centipoise at 25° C., where the organo groups are monovalent hydrocarbon radicals;

(e) an amount of from 0 to about 24 parts by weight per 100 parts by weight of said polydimethylsiloxane polymer, of an "M,D,T" silanol fluid comprising:
   (i) from about 1 to about 80 mole percent monoorganosiloxy units, M;
   (ii) from about 0.5 to about 50 mole percent triorgano-siloxy units, T;
   (iii) from about 1 to about 80, mole percent of diorgano-siloxy units, D;
   (iv) from 0 to about 25 mole percent siloxy units, wherein the organo groups of the M,D,T fluid are C1 to C10 monovalent hydrocarbon radicals;

(f) an amount of from 0.5 to about 5 parts by weight per 100 parts by weight of said polydimethylsiloxane polymer, of an alkoxysilane crosslinking agent of the formula:

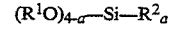

where R$^1$, R$^2$, and "a" are as previously defined;

(g) an amount of from about 0 to 2 parts by weight per 100 parts by weight of said polydimethylsiloxane of a disilazane or polysilazane stabilizer;

(h) an amount of from about 0.11 to about 0.17 parts by weight per 100 parts by weight of said polydimethylsiloxane polymer, of a diorganotin-bis-diketonate condensation cure catalyst of the general formula:

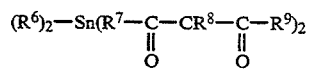

where R$^6$ is selected from C1 to C18 monovalent hydrocarbon radicals and R$^7$, R$^8$, and R$^9$ are the same or different monovalent radicals selected from the group consisting of hydrogen, R$^6$, OR$^6$, —Si(R$^6$)$_3$, aryl, acyl, and nitrile;

(i) an amount of from about 0.16 to about 3.1 parts by weight per 100 parts by weight of said polydimethylsiloxane polymer, of an epoxy silane adhesion promoter of the formula:

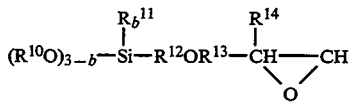

where $R^{10}$ and $R^{11}$ are C1 to C8 monovalent hydrocarbon radicals, $R^{12}$ and $R^{13}$ are C2 to C12 divalent hydrocarbon radicals and $R^{14}$ is selected from the group consisting of C1 to C18 monovalent hydrocarbon radicals and hydrogen and wherein b is an integer that ranges from 0 to 3;

(j) an amount of from about 0.16 to about 3.1 parts by weight per 100 parts by weight of said polydimethylsiloxane polymer, of an acrylic or methacrylic functional alkoxy silane adhesion promoter of the formula:

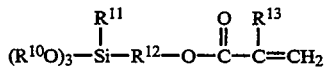

where $R^{10}$ and $R^{11}$ are C1 to C8 monovalent hydrocarbon radicals and $R^{12}$ is C1 to C8 divalent hydrocarbon radical and $R^{13}$ is selected from the group consisting of C1 to C8 monovalent carbon radicals and hydrogen; and (k) an amount of from about 0.16 to about 3.1 parts by weight per 100 parts by weight of said polydimethylsiloxane polymer, of a polyalkoxysilylalkyl isocyanurate of the formula:

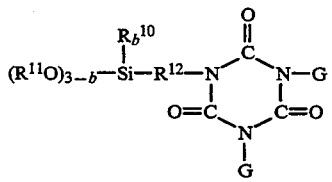

where "G" is selected from $R^{10}$ radicals of the formula:

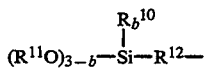

where $R^{10}$ is a C1 to C8 monovalent hydrocarbon radical or cyanoalkyl radical, $R^{11}$ is a C1 to C8 monovalent hydrocarbon radical or cyanoalkyl radical, $R^{12}$ is a C2 to C12 divalent radical selected from the group consisting of alkylenearylene, alkylene, cycloalkylene, halogenated alkylenearylene, halogenated alkylene, and halogenated cycloalkylene, and wherein b ranges from 0 to 3.

7. The composition of claim 6 wherein the cyanofunctional silane is selected from the group of cyano functional silanes consisting of:
2-cyanoethyltrimethoxysilane,
3-(cyanoethoxy)-3-methylbutenyltrimethoxysilane,
2-cyanoethylmethyldimethoxysilane,
2-cyanoethyltriethoxysilane,
2-cyanopropyltrimethoxysilane,
2-cyanoethylmethyldiethoxysilane,
3-cyanopropyltriethoxysilane, and
1-cyanoethyltris(methoxyethoxy)silane.

8. The composition of claim 6 wherein the tin condensation cure catalyst is selected from the group consisting of:
di(n-butyl)tin bis(acetylacetonate),
di(n-butyl)tin bis(benzoylacetonate),
di(ethyl)tin bis(lauroylacetonate),
di(methyl)tin bis(pivaloylacetonate),
di(n-octyl)tin bis(acetylacetonate),
di(n-propyl)tin bis(1,1,1-trifluoroacetylacetonate),
di(n-butyl)tin bis(ethylacetoacetate), and
di(n-butyl)tin (acetonate)(ethylacetoacetate).

9. The composition of claim 6 wherein the tin condensation cure catalyst is selected from the group consisting of:
di(n-butyl)tin bis(acetylacetonate),
di(n-butyl)tin bis(benzoylacetonate),
di(ethyl)tin bis(lauroylacetonate),
di(methyl)tin bis(pivaloylacetonate),
di(n-octyl)tin bis(acetylacetonate),
di(n-propyl)tin bis(1,1,1-trifluoroacetylacetonate),
di(n-butyl)tin bis(ethylacetoacetate), and
di(n-butyl)tin (acetonate)(ethylacetoacetate); and
wherein the polyalkoxysilylalkyl isocyanurate is selected from the group consisting of:
1,3,5-tris(methyldimethoxysilylpropyl)isocyanurate,
1,3,5-tris(methyldiethoxysilypropyl)isocyanurate,
1,3,5-tris(trimethoxysilylpropyl)isocyanurate, and
1,3,5-tris(trimethoxysilylethyl)isocyanurate; and
wherein the epoxy silane adhesion promoter is selected from the group consisting of:
gamma-glycidoxypropylmethyldimethoxysilane,
gamma-glycidoxypropyltriethoxysilane,
gamma-glycidoxypropylmethyldiethoxysilane,
gamma-glycidoxyethyltrimethoxysilane,
epoxycyclohexlethyltrimethoxysilane, and
epoxycyclohexylethyltrimethoxysilane; and wherein the acrylic functional alkoxy silane adhesion promoter is gammamethacryloxypropyltrimethoxysilane.

10. The composition of claim 9 wherein the polyalkoxysilylalkyl isocyanurate is 1,3,5-tris(methyldimethoxysilylpropyl)isocyanurate, and wherein the epoxy silane adhesion promoter is gamma-glycidoxypropylmethyldimethoxysilane.

11. A translucent room temperature vulcanizing silicone composition consisting essentially of:
(a) 100 parts by weight (pbw) of an alkoxy terminated polydimethylsiloxane polymer of the formula:

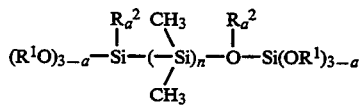

where $R^2$ is a substituted or unsubstituted C1 to C15 monovalent hydrocarbon radical, $R^1$ is a C1 to C8 aliphatic organic radical selected from alkyl radicals, alkyl ether radicals, alkylketone radicals, alkylcyano radicals, or a C7 to C13 arylalkyl radical: and wherein n is an integer ranging from about 50 to about 2500, and wherein a is an integer which is either 0 or 1, and wherein the viscosity range of said polydimethylsiloxane polymer is from about 100 to about 500,000 cps, at 25° C.; and wherein the terminal silicon atoms of said polydimethylsiloxane polymer must have at least two alkoxy groups;

(b) an amount of from about 5 to about 25 parts by weight of a reinforcing fumed silica filler per 100 parts by weight of said polydimethylsiloxane polymer;

(c) an amount of from 0 to about 1.6 parts by weight, per 100 parts by weight of said polydimethylsiloxane polymer of a cyano-functional alkoxy silane processing aid of the formula:

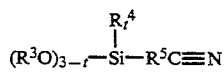

where each $R^3$ and $R^4$ is independently a monovalent hydrocarbon or substituted hydrocarbon radical having from 1 to about 18 carbon atoms, $R^5$ is a C2 to C12 divalent hydrocarbon radical, and t is an integer ranging from 0 to about 3;

(d) an amount of from about 7 to about 47 parts by weight per 100 parts by weight of said polydimethylsiloxane polymer, of a triorganosilyl endstopped diorganopolysiloxane having a viscosity ranging from about 10 to about 5000 centipoise at 25° C., where the organo groups are monovalent hydrocarbon radicals;

(e) an amount of from 0 to about 24 parts by weight per 100 parts by weight of said polydimethylsiloxane polymer, of an "M,D,T" silanol fluid comprising:

(i) from about 1 to about 80 mole percent mono-organosiloxy units, M;

(ii) from about 0.5 to about 50 mole percent triorgano-siloxy units, T;

(iii) from about 1 to about 80, mole percent of diorgano-siloxy units, D;

(iv) from 0 to about 25 mole percent siloxy units, wherein the organo groups of the M,D,T fluid are C1 to C10 monovalent hydrocarbon radicals;

(f) an amount of from 0.5 to about 5 parts by weight per 100 parts by weight of said polydimethylsiloxane polymer, of an alkoxysilane crosslinking agent of the formula:

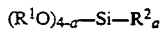

where $R^1$, $R^2$, and "a" are as previously defined;

(g) an amount of from about 0 to 2 parts by weight per 100 parts by weight of said polydimethylsiloxane of a disilazane or polysilazane stabilizer;

(h) an amount of from about 0.11 to about 0.17 parts by weight per 100 parts by weight of said polydimethylsiloxane polymer, of a diorganotin-bis-diketonate condensation cure catalyst of the general formula:

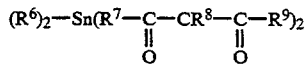

where $R^6$ is selected from C1 to C18 monovalent hydrocarbon radicals and $R^7$, $R^8$, and $R^9$ are the same or different monovalent radicals selected from the group consisting of hydrogen, $R^6$, $OR^6$, $-Si(R^6)_3$, aryl, acyl, and nitrile;

(i) an amount of from about 0.16 to about 3.1 parts by weight per 100 parts by weight of said polydimethylsiloxane polymer, of an epoxy silane adhesion promoter of the formula:

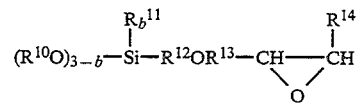

where $R^{10}$ and $R^{11}$ are C1 to C8 monovalent hydrocarbon radicals, $R^{12}$ and $R^{13}$ are C2 to C12 divalent hydrocarbon radicals and $R^{12}$ is selected from the group consisting of C1 to C18 monovalent hydrocarbon radicals and hydrogen and wherein b is an integer that ranges from 0 to 3;

(j) an amount of from about 0.16 to about 3.1 parts by weight per 100 parts by weight of said polydimethylsiloxane polymer, of an acrylic or methacrylic functional alkoxy silane adhesion promoter of the formula:

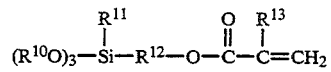

where $R^{10}$ and $R^{11}$ are C1 to C8 monovalent hydrocarbon radicals and $R^{12}$ is a C1 to C8 divalent hydrocarbon radical and $R^{13}$ is selected from the group consisting of C1 to C8 monovalent carbon radicals and hydrogen; and (k) an amount of from about 0.16 to about 3.1 parts by weight per 100 parts by weight of said polydimethylsiloxane polymer, of a polyalkoxysilylalkyl isocyanurate of the formula:

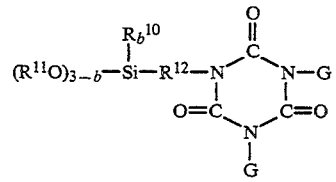

where "G" is selected from $R^{10}$ radicals of the formula:

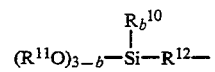

where $R^{10}$ is a C1 to C8 monovalent hydrocarbon radical or cyanoalkyl radical, $R^{11}$ is a C1 to C8 monovalent hydrocarbon radical or cyanoalkyl radical, $R^{12}$ is a C2 to C12 divalent hydrocarbon radical selected from the group consisting of alkylenearylene, alkylene, cycloalkylene, halogenated alkylenearylene, halogenated alkylene, or halogenated cycloalkylene, and wherein b ranges from 0 to 3.

12. A method of sealing a joint comprising applying the sealant composition of claim 1 to said joint and curing said sealant.

* * * * *